Feb. 2, 1965 S. P. HENRY 3,168,129
APPARATUS FOR BENDING TUBE PANELS AND THE LIKE
Filed Oct. 25, 1961 8 Sheets-Sheet 1

INVENTOR.
Scott P. Henry
BY
C. F. Bryant
ATTORNEY

Feb. 2, 1965   S. P. HENRY   3,168,129
APPARATUS FOR BENDING TUBE PANELS AND THE LIKE
Filed Oct. 25, 1961   8 Sheets-Sheet 6
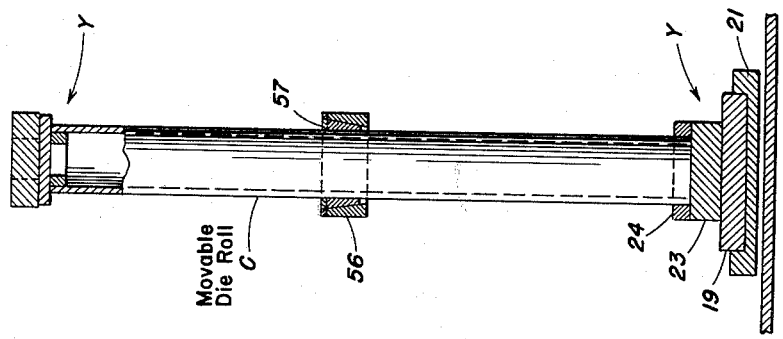
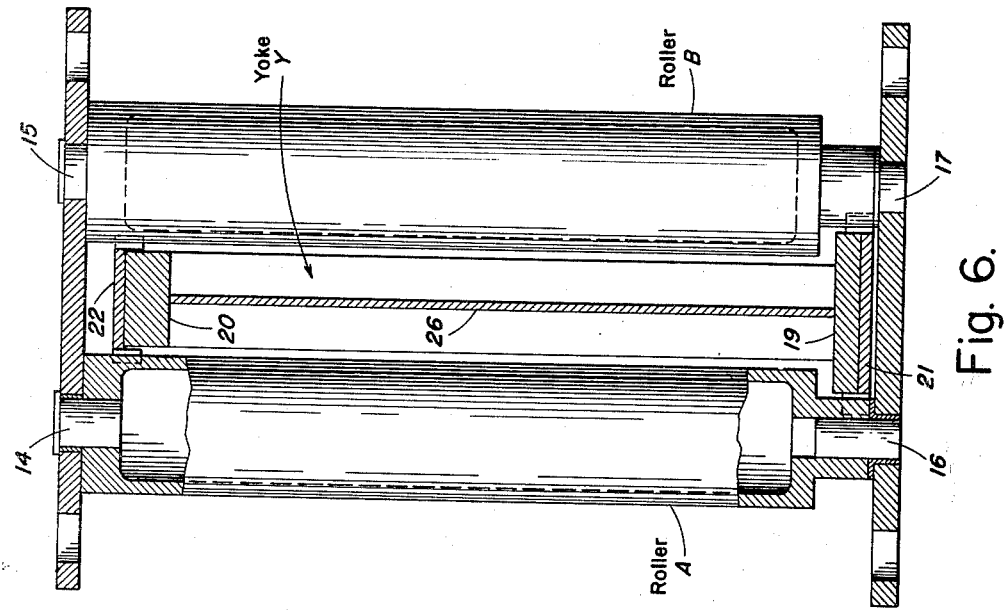
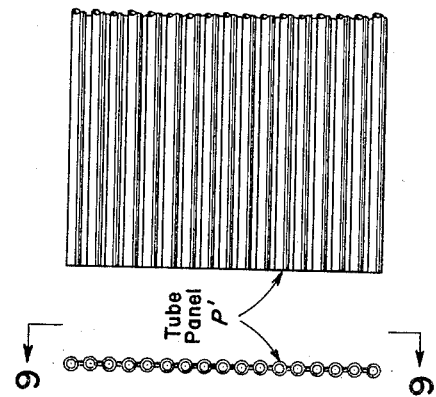
INVENTOR
Scott P. Henry
BY
ATTORNEY

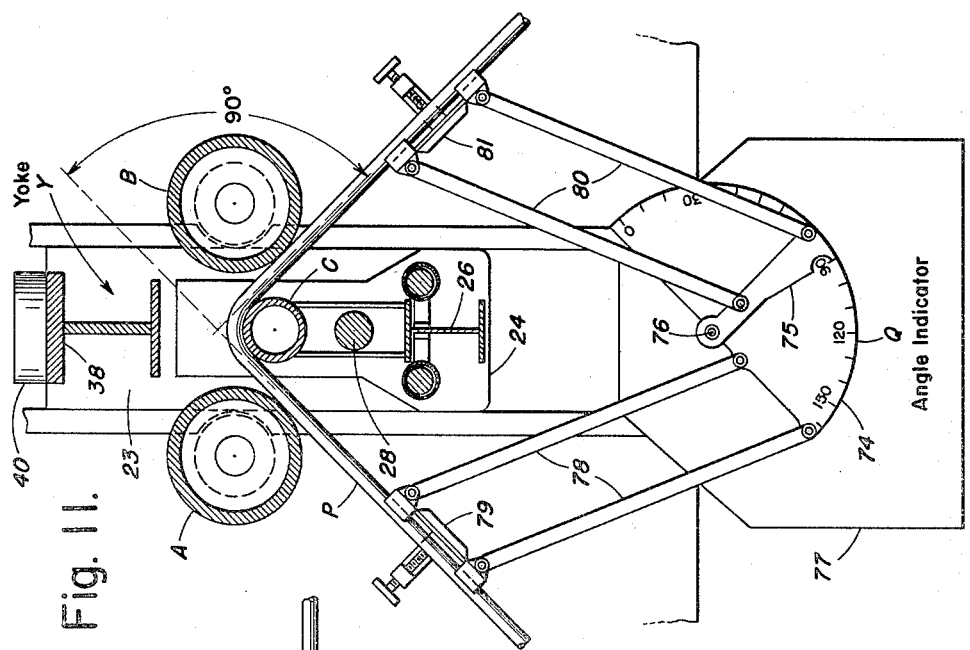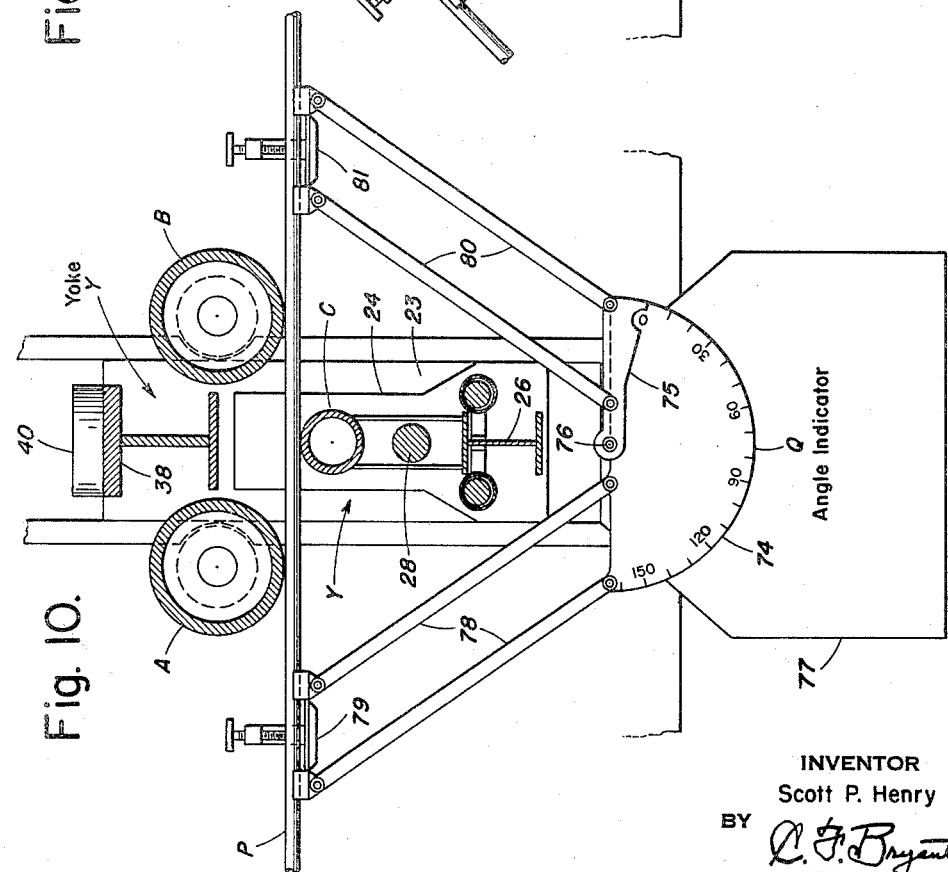

INVENTOR
Scott P. Henry
BY C. F. Bryant
ATTORNEY

United States Patent Office 3,168,129
Patented Feb. 2, 1965

3,168,129
APPARATUS FOR BENDING TUBE PANELS
AND THE LIKE
Scott P. Henry, Ringgold, Ga., assignor to Combustion Engineering, Inc., Windsor, Conn., a corporation of Delaware
Filed Oct. 25, 1961, Ser. No. 147,514
6 Claims. (Cl. 153—24)

This invention relates to constructing tubular walls such as are used in boiler furnaces which are faced with fluid-cooled tubes, and it has special reference to an improved apparatus for bending such multi-tube panels and the like following assemblage of individual tubes into straight panel sections and in preparation for later installation of the bent panels into steam generating boiler furnaces or the like at the erection site.

Modern steam generators of both large and small capacity are commonly lined with steam generating tubes which are connected into the water circuits of the boiler furnace, where they form continuous conduits extending from the bottom to the top of the furnace wall. One illustrative steam generating furnace in which such tube panels are used is disclosed by U.S. Patent 2,946,116, issued July 26, 1960, in the names of W. C. Norris et al. under title of "Tubular Wall Construction" and assigned to the same assignee as this invention. Another such furnace is disclosed by U.S. Patent 2,987,052, issued June 6, 1961, in the name of W. H. Armacost under title of "Wall Construction for Pressurized Furnace."

Prior to the invention of the Norris et al. Patent 2,946,116 a tubular wall of the type here considered was completely erected in the field, each tube length of a circuit being separately raised and held in place while adjoining tube length ends were aligned and welded together. When using the above-mentioned prior conventional method of constructing tall tubular walls composed of relatively small diameter tubes arranged in substantial side-by-side contact, the cost involved for erecting such walls became so high as to be uneconomical.

The Norris et al. invention provided a novel and improved method of constructing a tubular wall of the type mentioned above, which method included the welding and bending in unison of tubes forming group components of such a wall, whereby the cost of constructing these walls was substantially reduced. Certain of the group components of such a wall required bending in the shop prior to shipment to the erection site; and such shop bending typically was accomplished via use of the press apparatus which the Norris et al. Patent 2,946,116 discloses in FIG. 5. There a plurality of wall tubes assembled side by side into a panel 36 are shown as being bent in press mechanism 60–62 while the plane of the panel occupies a generally horizontal position; the spaced bending rollers 60 of that Norris et al. FIG. 5 having their axes disposed in a common horizontal plane.

This prior art horizontal-plane bending technique has been found to have serious disadvantages. Insertion of the panel assemblage 36 into the press apparatus 60–62 of the Norris et al. FIG. 5 requires the use of overhead crane apparatus 58 during the complete bending cycle, and requires excessive set-up and bending time with perhaps 15 minutes being needed to line up the panel in the horizontal press in preparation for the bending operation. Moreover, such horizontal-plane operation of the prior art is further restricted in that the requirement of removing the bent panel from the press can be met only if the bend imparted thereto is kept below certain angles above which it becomes impossible to remove the bent panel from the press.

The present invention overcomes the foregoing disadvantages in a way which has proven to be unexpectedly effective and advantageous and which has broad utility of a high order.

Generally stated, the object of this invention is to provide an improved apparatus for bending water-wall panels and the like as assembled from a plurality of individual tubes arranged side by side and either fastened together (as shown at P in the drawings hereof) or merely arranged in side-by-side relationship without such fastening.

A more specific object is to overcome the limitations of undesirable slowness and bend-amount restriction which are inherent in prior art apparatus and practices such as are typified by FIG. 5 of the Norris et al. Patent 2,946,116.

Another object is to provide a new apparatus capable of bending all panel types in less time than heretofore required and with sharply increased economy and convenience.

A further object is to minimize the need for an overhead crane during the bending operation and to enable the complete bending cycle to take place while the tube panel being acted upon is kept relatively close to the floor level.

Other objects and advantages will become apparent as the disclosure and description hereof proceeds.

One illustrative form of apparatus provided by me for practicing this invention is disclosed by the accompanying drawings wherein:

FIG. 6 is a view in vertical section taken along line 6—6 of FIG. 4 which shows how the central yoke parts that carry the movable die roll are mounted for forward and backward sliding through the sidewise space between the two stationary vertical rollers of the machine;

FIG. 7 is a view in vertical section taken along line 7—7 of FIG. 4 and showing further details of the central die roll and of the movable yoke means by which it is carried;

FIGS. 8 and 9 represent a so-called "fusion-welded" tube panel which the new machine is adapted to bend with the same ease and effectiveness as it does the "tangent-tube" panel that is represented at P in each of FIGS. 1, 2, 3, 4 and 5;

Figure 2:
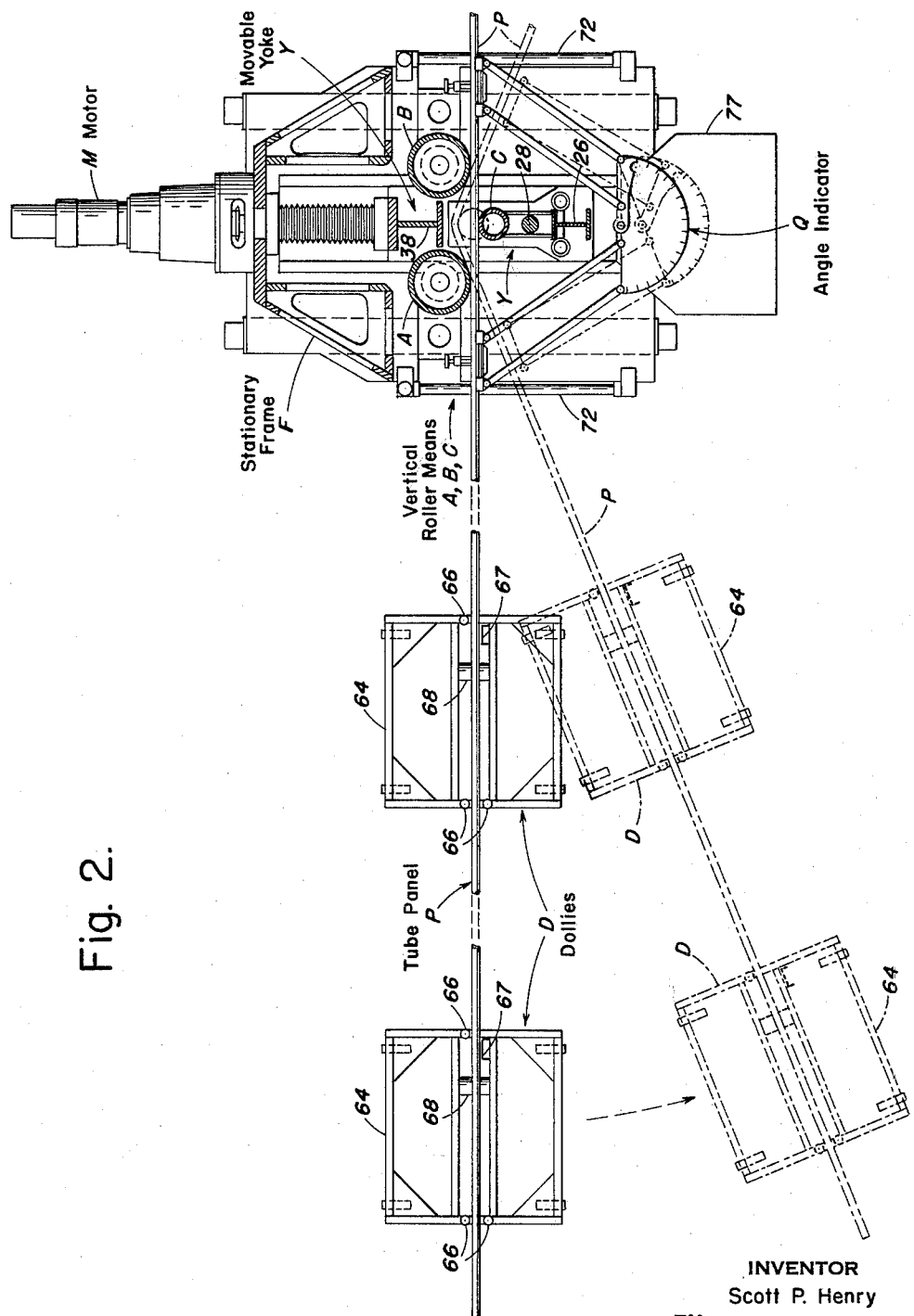
FIG. 2 is a top plan view, partly in section, of the FIG. 1 apparatus and installation as taken along line 2—2 of FIG. 1.
Figure 3:
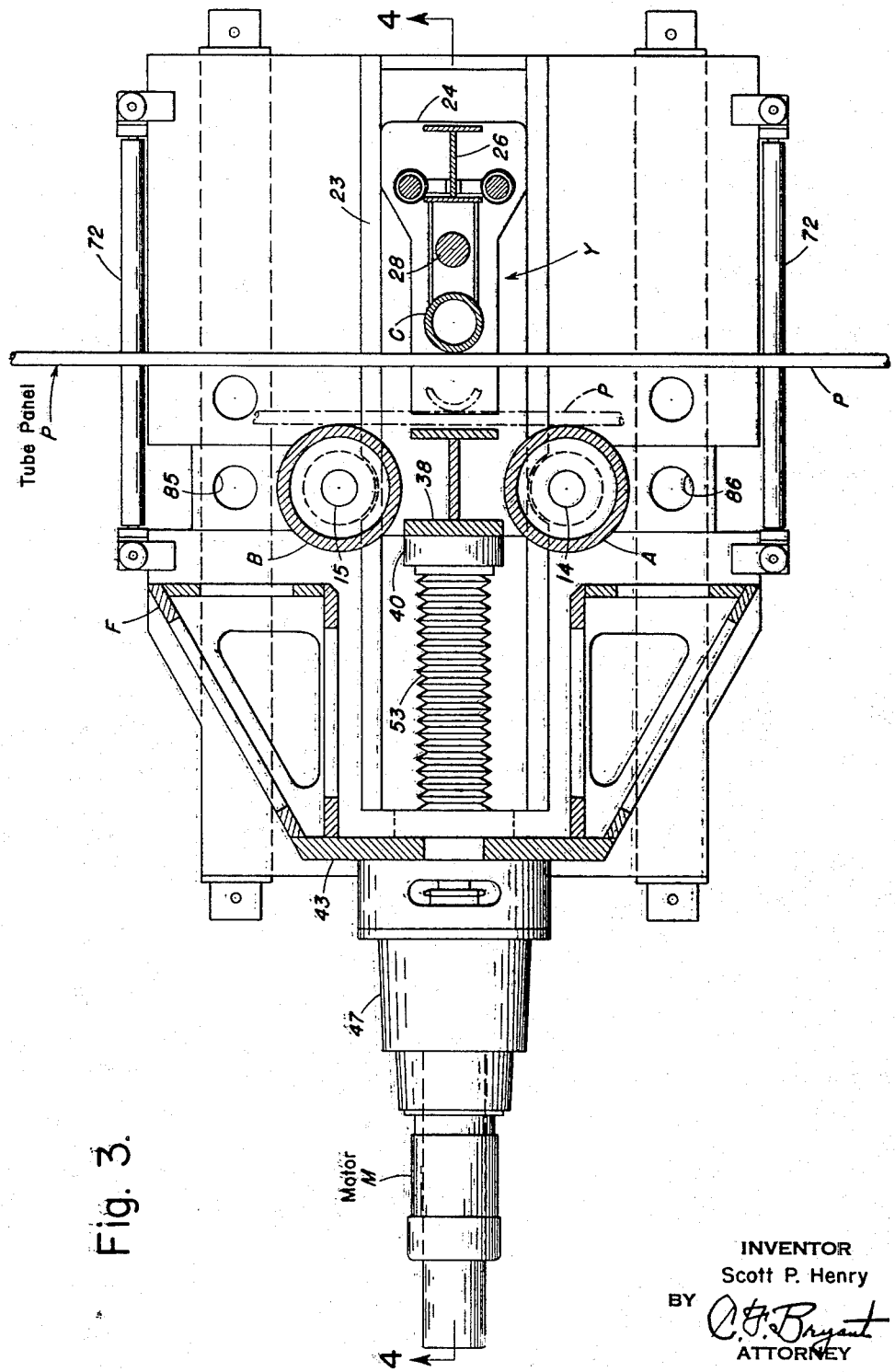
FIG. 3 is an enlarged top-plan sectional representation of the FIGS. 1–2 bending machine as viewed from line 3—3 of FIG. 4.
Figure 13:
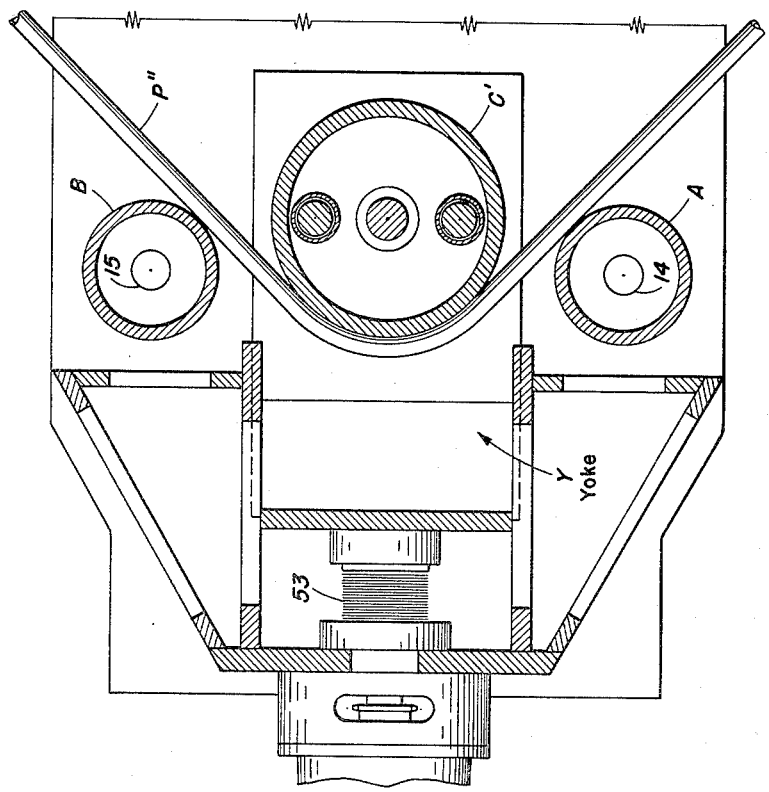
Figure 12:
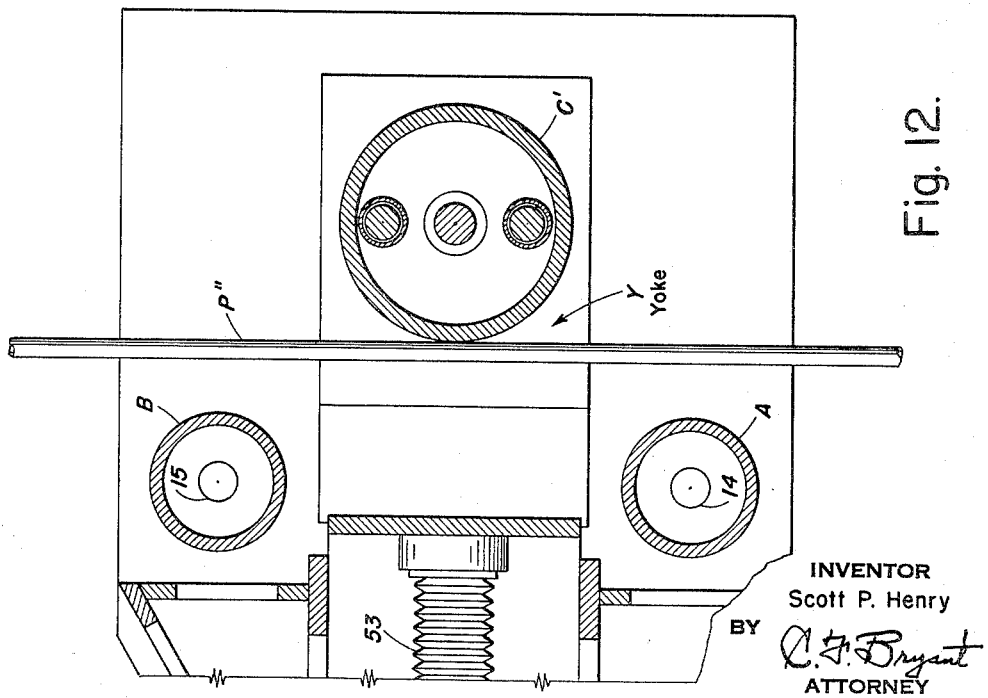

FIGS. 10 and 11 are enlarged and simplified representations of the FIG. 2 machine showing attachment of an angle-indicator Q to one of the tubes in panel P and illustrating how such device registers the angular bend that is imparted when the originally straight tube of FIG. 10 has been bent through 90 degrees as illustrated in FIG. 11; and FIGS. 12 and 13 are simplified representations which generally correspond to the straight-line and the broken-line portions of FIGS. 2–3 and which show how the panel bending machine of the earlier views can be modified by substitution of a larger-diameter die roll C' when panel bends of enlarged radius are desired.

Referring to the drawings, the new panel bending apparatus of this invention departs from prior art teachings and practices by positioning the three cooperating rollers A–B–C with their axes generally vertical. The first two of these rollers A and B are spaced apart sideways along the front side of the machine frame F by which they are supported. The cooperating central die roll C is carried by the represented upper and lower parts of a yoke assemblage Y which extends through the space between the first two rollers A and B and which is mounted in the machine frame F in a manner that permits forward and backward movement with respect to those first and second rollers. All three of the vertical rolls A–B–C are relatively long in comparison to their diameters.

The machine frame F rises upwardly from base 10 and consists of the structural portions whose general organization is believed to be self-evident. Screws 18 serve to level the machine with respect to the floor surface upon which it rests. The main frame F utilizes top and bottom portions 11 and 12 by which the upper and lower shaft ends for rollers A and B are supported in a manner permitting the rollers to rotate. Affixed to the top portion 11 is a removable plate 13 into which the upper shaft ends 14 and 15 fit; and the lower shaft ends 16 and 17 of these two rollers A and B are similarly engaged by cooperating openings in the lower frame member 12.

Looking next at the central die roll C, it is carried by the aforementioned movable yoke Y through the medium of lower and upper members represented at 19 and 20 in each of FIGS. 4, 5, 6 and 7. These lower and upper yoke members 19 and 20 respectively are slidingly engaged by channeled plates 21 and 22 mounted as shown along the lower and the upper portions of the machine frame F.

The central or movable die roll C has its lower end carried by the lower slidable member 19 via parts 23 and 24 organized as shown. A structural member 26 extends upwardly in front of the central die roll C and carries on its top a plate shown at 27 in each of FIGS. 4 and 5. Extending upwardly between said die roll C and the structural member 26 is a tierod shown at 28 in each of FIGS. 2, 3, 4, 10 and 11.

Figure 4:
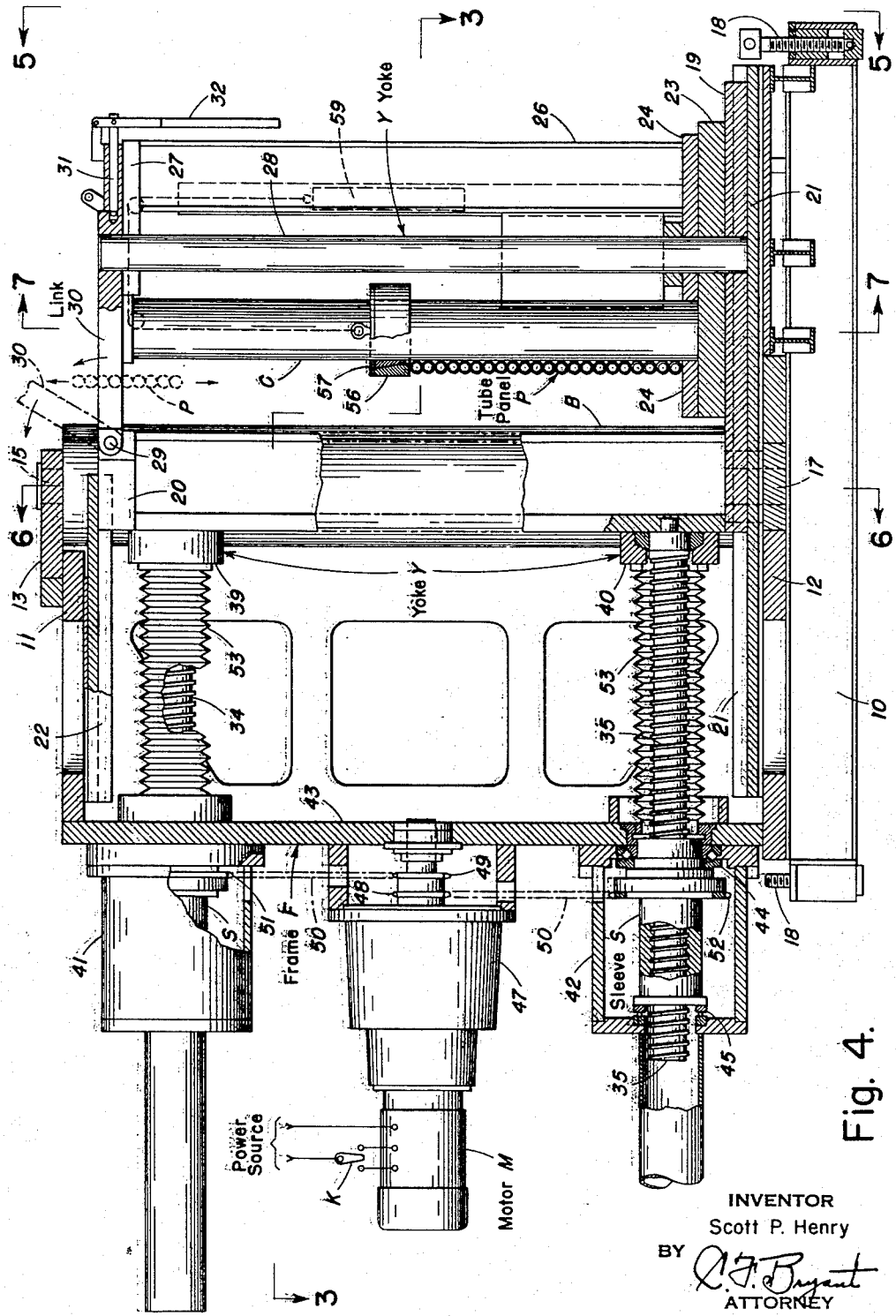
FIG. 4 is a view in vertical section taken on line 4—4 of FIG. 3 which shows further details of the machine including the vertical bending rollers and the upper and lower screw mechanisms which are motor driven and by which the tremendous pressures needed to accomplish panel bending are generated.

Fittable over the protruding upper end of tierod 28 is an openable link member 30 which is hinged at its rear or left end as shown at 29 in FIG. 4. The front or right end of member 30 is normally locked in the closed position of FIG. 4 via a pin 31. Under this condition the member 30 closes the space between movable die roll C and the stationary vertical rollers A–B (again see FIG. 4) and rigidly attaches the top of tierod 28 to the forward end of the top yoke member 20. This assures proper transmission of bending force from said top yoke member 20 to die roll C via the engaged top end of tiebar 28.

Figure 5:
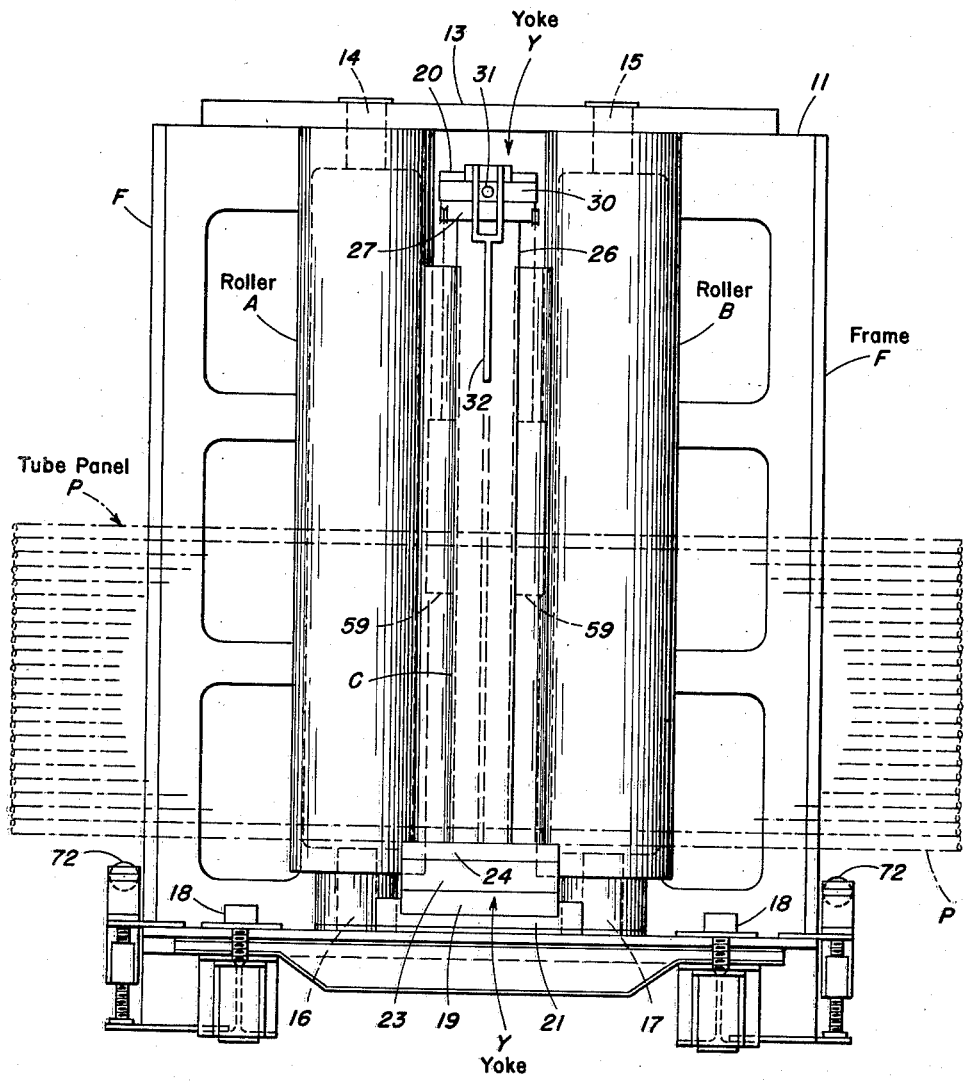
FIG. 5 is a view taken along line 5—5 of FIG. 4 showing how the panel bending machine of the earlier views appears when viewed from the front end thereof.

But when pin 31 is drawn out of the end opening in top link 30 by an outward pulling of the lever shown at 32 in FIGS. 4–5, said link 30 now is free to be swung upwardly around hinge 29 to and past the position shown by broken lines in FIG. 4. The space between central die roll C and stationary rollers A–B now is opened. Such opening performs the highly useful function of permitting a tube panel such as shown at P to be lowered downwardly into said space as indicated by the dotted representation in FIG. 4. The significant advantage of this will be described more fully at a later point in the specification.

With the tube panel thus inserted as shown by the full lines P of FIGS. 1–2–3–4, and with the openable link 30 closed as shown by the full lines in FIGS. 4–5, the bending machine is in readiness for a rearward drawing of the central die roll C and the panel P towards and against the cooperating spaced rollers A and B that are carried by the main frame F as already described.

In the machine organization here illustrated, such bending force is applied to the rear ends of upper and lower threaded pull rods 34 and 35 provided as shown in the upper and the lower portions of the machine. Still referring to FIG. 4, the forward or right ends of these two rods 34–35 are secured to the upper and lower portions of a vertical structural member which is shown at 38 in each of FIGS. 2, 3, 10 and 11 and the upper and lower parts of which respectively are affixed to the earlier described upper yoke member 20 and lower yoke member 19. The attachment here represented utilizes collars 39 and 40 and restrains the threaded pull rods 34 and 35 against rotation.

Surrounding the left ends of these two pull rods 34 and 35 are threaded sleeves S which are respectively enclosed in upper and lower housings 41 and 42 that abut and extend rearwardly from the rear structural plate 43 of the machine frame F. This arrangement is best shown by FIGS. 3 and 4.

Each of these threaded sleeves S is provided with a main thrust bearing 44 between its forward end and the main frame plate 43, and with a rear thrust bearing 45 between the rear collar end and the back of the collar housing 41 or 42 (see lower left of FIG. 4).

Power for rotating the two threaded sleeves S may be imparted thereto from any suitable source such as the electric motor represented at M. In the arrangement shown this motor drives a speed reducer 47 the output shaft of which is provided with sprockets 48 and 49 respectively connected through chains 50 with driven sprockets 51 and 52 that are carried by the threaded sleeves S which surround the upper and lower threaded pull rods 34 and 35.

Figure 1:
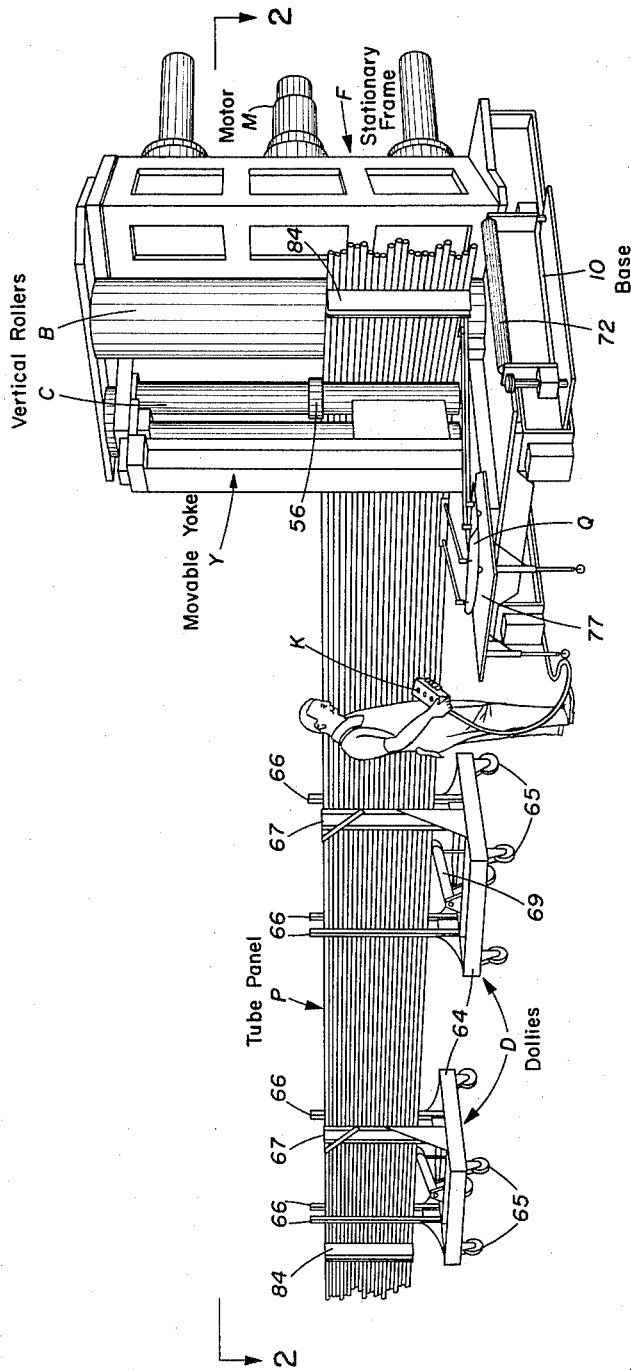
FIG. 1 is a photographic representation of the new gang-bending apparatus of this invention showing how the co-acting bending rollers thereof are disposed with their axes vertical and also showing a multi-tube water-wall panel inserted in the machine in readiness for a simultaneous bending of all of the individual tubes in that panel.

Through the medium of a suitable control switch shown at K in each of FIGS. 1 and 4, the motor M may be made to drive the threaded sleeves S in one direction when it is desired to move the yoke assemblage Y and carried roller C to the extreme front position represented in FIGS. 3 and 4, or in the opposite direction when it is desired to pull the yoke Y and central die roll C rearwardly towards and between the two stationary rollers A and B incident to accomplishing the bending of a tube panel P. In this way an operator of switch K can adjust the yoke Y and die roll C to any position desired. Changes in such position are accompanied by forward or rearward movement of the threaded pull rods 34–35 through the rear frame plate 43; and to protect those threaded rods from having dirt or the like accumulate thereon, each of them is provided with an expansible shield shown at 53 in FIGS. 3, 4, 12 and 13.

In the panel bending machine here shown by way of illustration, the motor M has a capacity of ten horsepower and each of the driven threaded sleeves S and associated pull rods 34 and 35 is designed to set up a bending force of the order of 100 tons. Combining the two makes available a total force of 200 tons which is exertable through yoke Y upon the central die roll C of the machine. If desired, forces of equivalent magnitude can of course be made available through other means such as hydraulic cylinders (not shown) which can be substituted for the motor-driven threaded collars S and pull rods 34–35 that are here represented.

The machine illustrated by the drawings hereof is designed to accommodate tube panels P up to six feet in width. This means that the central die roll C and the cooperating rollers A and B have vertical lengths somewhat in excess of six feet. The design further is such that panels of lesser width can be bent in the machine with equal success and convenience. Such flexibility is illustrated by the showing in FIGS. 1, 2 and 5 of a panel P whose width is of the order of about 3½ feet.

Each panel P that is inserted into the machine, in a manner more fully to be explained later, and placed in contact against the back side of central die roll C has a collar 56 lowered against the top edge thereof and clamped securely in place around said roller C. Such clamping may be accomplished in any suitable manner as by the aid of a split conical section 57 which by wedge action prevents the main collar portion 60 from moving upwardly along roller C once it has been lowered into proper position therearound. Since such a collar 56-57 is relatively heavy, it is found advantageous to counterbalance it by means of weights such as are shown at 59 in FIGS. 4 and 5.

The panel bending machine just described preferably is mounted on an area of shop flooring which is relatively smooth and which permits free and unobstructed travel thereover of panel-supporting dollies such as are represented at D in FIGS. 1 and 2. Each of these dollies is shown as comprising a frame 64 carried on four caster-mounted wheels 65 that provide for ready travel in any direction. Extending upwardly from the frame 64 are three side rods 66 plus a cooperating channel member 67 between which the panel P to be supported with its axis vertical can be lowered as shown in FIGS. 1-2.

Further carried by each dolly D is a support bar 68 upon which the lower panel edge rests. This bar is carried by an arm shown at 69 in FIG. 1 which can be raised or lowered by an operator through the medium of a cylinder therebeneath and a fluid pump 70 which is mounted on the channel member 67 and which can be manually operated. In this way the height of the support bar 68 above floor level can be adjusted so that it matches the height of the bending machine member 24 (see FIGS. 4-5) upon which the panel P also rests during the bending operation.

Also provided along the left and right side edges of the machine base 10 are rollers shown at 72 in each of FIGS. 1-2-3 and 5. These are useful incident to bringing the panel P into and out of the machine before and after the bending operation.

Still further provided in the complete installation here represented is a bend-angle indicator shown at Q in each of FIGS. 1, 2, 10 and 11. Purpose is to convey to the operator an accurate indication of how much bend is being imparted to the panel P during the bending cycle.

From FIGS. 10 and 11 it will be seen that this device Q utilizes a lower reference plate 74 graduated in degrees from 0 to 160, and a cooperating indicator member 75 which is pivoted to the lower plate 74 at point 76. These two members are supported on a horizontal platform 77 over which they are free to slide from the starting position of FIG. 10 to some finishing position such as is shown in FIG. 11.

A first pair of parallel arms 78 interconnects the reference plate 74 with a clamp 79 that is secured to the lowermost of the panel tubes P at a location to the left of bending rollers A-C-B. The indicator member 75 is similarly connected to the right portion of the same panel tube by means of a second set of parallel arms 80 and a second clamp 81.

Starting from the "0-indication" position of FIG. 10 where the panel tube is straight or unbent, the bending which the machine imparts to said tube shifts the relative positions of reference plate 74 and indicator 75 to the "90 degree-indication" condition of FIG. 11. The latter tells the operator that the tube panel has been bent through a total angle of 90°.

Bending amounts either greater or lesser than 90° are shown with equal accuracy by the angle indicator apparatus Q herein disclosed and just described.

*How the new panel bending facilities hereof operate*

The manner of operation of the improved installation herein disclosed will have become more or less apparent from the foregoing description of the apparatus components and machine organization.

In preparing the machine for a bending operation, an operator, such as is shown centrally in FIG. 1, actuates switch K so that motor M drives threaded sleeves S in the direction to advance yoke Y and die roll C to the forward limit of their travel which is represented in FIGS. 3 and 4. This provides ample space between the central movable die roll C and the cooperating stationary rollers A and B. The top link 30 of yoke Y next is opened past the dotted position of FIG. 4 so that the panel assemblage P to be bent can readily be lowered directly into the aforementioned space under the action of an overhead crane (not shown). Such crane may make use of a hoist pulley plus hook and chain (or clamp) generally corresponding to the showing at 58 in FIG. 5 of the aforementioned U.S. Patent 2,946,116 to Norris et al.

Here however the panel P to be bent is brought into the new vertical-roller machine from above with the plane thereof in a generally vertical position typified by FIGS. 1, 2, 4 and 5 hereof. The portion of the panel to be bent is in this way lowered directly into the machine between the central die roll C and the stationary rollers A-B, as the dotted representation P of FIG. 4 indicates. This having been done, the top yoke member 30 is reclosed to the full line position of FIG. 4 and there locked by pin 31.

Overhanging portions of this panel are at the same time lowered into one or more of the dollies shown at D in FIGS. 1-2; and each of these dollies has its support bar 68 adjusted to a height above the floor surface which is substantially the same as the top of the machine member 24 upon which the lower edge of the panel P rests (again see FIG. 4).

This having been done the panel is completely freed from attachment with the overhead crane (not shown) which brought it into the position of FIG. 1. The collar 56-57 of FIG. 4 now is lowered into contact with the panel top and there securely clamped into place. This prevents any tendency for the individual tubes to spread away from each other as the bending later progresses.

At this point the unbent panel P when viewed from the top looks as shown by the full lines of FIG. 2. The angle indicator Q of FIG. 10 now is attached to the lowermost panel tube via the clamps 79 and 81 and placed on top of its support platform 77; and the indicator 75 thereof gives an initial reading of zero.

An operator of control switch K now causes motor M to draw the central die roll C and the panel P beneath the collar 56 thereabove towards and against the stationary rollers A and B. In doing this the panel P advances from the full-line representation of FIG. 3 to the broken-line representation wherein it is just starting to contact the spaced vertical rollers A and B.

Further movement by motor M of the central die roll C draws the contacted portion of the panel between the spaced rollers A and B, as the broken line showing for P in FIG. 2 indicates. As the panel is thus bent, the overhanging portions thereof that rest upon dollies D swing those dollies counterclockwise in FIG. 2 over the shop floor to the broken line representations of that drawing view. Bending in this fashion continues until the final amount of bend has been imparted to the panel.

All during this operation the angle indicator Q accurately registers the number of degrees to which the bend has progressed. Assuming that the final bend to be imparted is of the 90 degrees indicated by FIG. 11, experience shows that stopping the bending operation at the 90-degree point will not suffice; since there is a "springback" of perhaps two or three degrees which upon release of the pressure exerted by central die roll C will cause the panel to go back to a stabilized bent condition of perhaps 87 degrees. Knowing that this does occur, the operator thus continues the initial bending action until the indicator Q registers say 93 degrees; and this assures that a final bend of the desired 90 degrees will remain in the panel P after it is removed from the machine.

To prepare for such removal the operator of switch K now reverses motor M and thus withdraws the central die roll C forwardly and out of contact with the bent panel. Indicator Q now should register the desired final bend which the panel retains, following the over-compensation described above. Indicator clamps 79 and 81 now are removed from the lower panel tube so that the entire assemblage Q can be taken away from the bent panel P.

The upper yoke member 30 is once more unlatched at 31 and moved toward and past the broken line position of FIG. 4. The conventional overhead crane earlier referred to is now brought above the bent panel and suitably hooked thereto for the purpose of lifting such bent panel vertically up out of and away both from the bending machine and from the dollies D by which the overhanging portions were supported during the bending cycle.

In this way the cycle is completed and the apparatus placed in readiness for accomplishment of another bending operation either on the same panel or on another panel.

*Vertical roller apparatus is highly useful and versatile*

The new and improved bending machine facilities with vertical rollers A–B–C are capable of acting on tube panels of a wide variety of different types and designs. The one represented at P in FIGS. 1–2 and 5 is of the so-called "tangent" type wherein the individual tubes are arranged side by side with each tube touching the next and tack welds are made at intervals to hold the tubes together.

A second type of panel which also can be bent with equal ease and convenience is the "fusion welded" type represented at P' in FIGS. 8–9. Here the individual tubes are spaced somewhat apart and the resulting gap therebetween filled in with weld deposits. Such fill-in of metal between adjacent tubes can mechanically be performed only on straight tubes; therefore bending of tubes in such a panel assemblage has to be done after the panel has been fusion welded together. This is in contrast to the "tangent" panel design earlier described where it is possible (though not economical) to bend the various tubes thereof individually and then assemble them into the panel after such individual bending. My new bending apparatus with vertical rollers is thus especially advantageous in connection with such "fusion welded" panel assemblages.

Moreover, it is equally useful in effecting the simultaneous bending of a large number of individual tubes which have been placed in tangent side-by-side relation but not tack welded or otherwise permanently secured together. In such a situation the tubes can be temporarily held together by side clamps of the type shown at 84 in FIG. 1. Each such clamp may consist of straight bars disposed against the opposing sides of the assemblage and there held together by bolts (not shown) or other suitable means.

It also is to be pointed out that the improved bending facilities of my invention can be used with equal advantage to straighten tubes that previously have been bent, or to change the amount of bend in such tube assemblages.

Still further, the machine lends itself to imparting bends of differing radii to the tube assemblages that are acted upon. In the machine embodiment of FIGS. 1 through 11 the central die roll C is of relatively small diameter and the resultant bend has a correspondingly small radius. If bends of a larger radius are desired the modification shown by FIGS. 12 and 13 may be availed of. There the two vertical rollers A and B are spaced one from the other by a somewhat wider distance; such wider space being achieved by transferring their shaft mountings to the more separated positions shown at 85 and 86 in FIG. 3. At the same time the small diameter central die roll C is replaced by a larger diameter central die roll shown at C' in FIGS. 12–13. With this modification the machine imparts to the tube panel P" acted upon a bend having the correspondingly larger radius which FIG. 13 illustrates.

From the foregoing it will be seen that the new vertical-roller panel bending facilities of this invention have practical advantages of a high order. More specifically, material handling is decreased significantly because the panel is bent when in a vertical plane (instead of horizontal), and further because the new machine is capable of being loaded and unloaded from the top. Also the amount of bend placed in the panel is not restricted as was the case with the old method (FIG. 5 of Norris et al. Patent 2,946,116) due to the short press stroke obstructing removal of the bent panel.

Further, accuracy and quality of bend are more easily controlled due to the panel being close to the floor where it can easily be supported. Still further, the bend indicator Q is readily attached to the panel because it is close to the floor; and with this attachment accuracy of bend is very easy to maintain, and compensation assuring the desired final angle can reliably be realized.

The foregoing features of advantage and convenience contribute to the highly practical benefits of lowered bending time and raised production capability. Time for setting the panel up in the machine is reduced from the perhaps fifteen minutes needed with the prior art benders to less than one minute; the actual bending of the panel by the vertical rollers A–B–C takes only a few seconds; and the bent panel is thereafter removable from the apparatus again in less than one minute. Production capability of a high order is accordingly achieved.

The technique and facilities herein disclosed are therefore capable of a wide and diversified application and the specific panel-bending functions described are therefore to be interpreted in an illustrative rather than in a restrictive sense.

What I claim is:

1. In a machine for bending tube panels and the like, the combination of a generally upright frame; relatively long first and second rollers mounted in and supported by said frame with their axes vertical and with the rollers being spaced apart sidewise along the front portion of the frame; a yoke also carried by said frame and organized for movement forwardly and rearwardly with respect to those first and second rollers, said yoke having upper and lower parts which are vertically spaced one from the other and which extend forwardly through said sidewise space between said first and second rollers; a relatively long die roll carried by and between said upper and lower yoke parts with its axis vertical and with such die roll being thus supported centrally in front of said first and second rollers for movement by the yoke towards and away therefrom; yoke-driving means carried by said frame and operative on said yoke in a way effective first to advance said die roll far enough in front of the first and second rollers as to provide space sufficient for a ready downward insertion of a tube panel or the like between that die roll and those first and second rollers and thereafter effective forcefully to pull said die roll rearwardly towards and between the sidewise spaced first and second rollers with an accompanying bending of such inserted tube panel; and release means for the aforementioned upper yoke part which enable that part to be removed from over the space between the die roll and the first and second rollers thus permitting a tube panel or the like initially to be lowered directly into said space in preparation for bending, and again to be removed upon completion of the bending operation then permitting the bent panel or the like to be taken from the machine via an upward raising directly out of said space, an external collar encircling the upper portion of said vertical dye roll and being slidable downwardly therealong so as to rest upon and engage the top edge of each tube panel that is brought into the machine for bending thereby, and means for clamping said collar in the panel-engaging position whereby to restrain the individual panel tubes against upward spreading during the bending operation.

2. Panel bending apparatus as defined by claim 1 wherein said yoke-driving means utilize upper and lower threaded rods which are affixed to and carried by said yoke, upper and lower threaded sleeves which surround and engage said rods and which are carried by said frame in a way permitting the sleeves to be rotated while restraining them against endwise movement with respect to the frame, and motor means arranged to drive said threaded sleeves in one rotative direction when forward movement is to be imparted to said yoke and die roll and in the other rotative direction when rearward movement is to be imparted to the yoke and die roll.

3. In a panel bending installation as defined by claim 1, the combination of a device for indicating how much a tube panel is being bent around said vertical die roll as that roll draws the panel against and between said spaced first and second vertical rollers, said device comprising a reference plate and an indicator member pivoted thereto for relative movement thereover, a generally horizontal platform for supporting said two pivoted members forwardly of said die roll at a level relatively close to the floor, a first pair of parallel arms adapted to link said reference plate to a selected panel tube along a portion thereof that extends away from one side of said die roll, and a second pair of parallel arms adapted to link said indicator member to said selected panel tube along a portion thereof that extends away from the opposite side of said die roll whereby all bending imparted to the panel is communicated to said reference plate and indicator members and continuously registered thereby.

4. Angle-indicating facilities as defined by claim 3 wherein said reference plate is marked in degrees and wherein said indicator member rotatively moves around the pivot point over that plate in register with the said degree markings thereon so as to give a direct reading of the bend angle.

5. In a panel bending installation as defined by claim 1, horizontal floor surface upon which said bending apparatus frame rests and which surface continues away from such frame in the direction that is occupied by an extending portion of an unbent tube panel when lowered into the vertical bending roller means of said apparatus with the engaged portion of such panel then being held in a vertical plane by such roller means, at least one dolly device interposed between said extending portion of the tube panel and said floor surface and being arranged to support that overhanging panel porton directly from such floor surface without dependence upon overhead crane means, said dolly device further serving to maintain said overhanging panel portion in a vertical plane and being easily rollable along the floor surface so as to move freely with the overhanging panel portion during the positional shifting thereof which is produced by bending of the apparatus-engaged portion of said panel under action of said vertical roller means.

6. Panel-overhanging supporting facilities as defined by claim 5 wherein the recited dolly device is equipped with means for adjusting the height of over-hang-panel support into a generally matching relation with the support level that is established by said bending apparatus for the portion of the same panel which is engaged by said vertical bending roller means.

References Cited in the file of this patent

UNITED STATES PATENTS

| | | |
|---|---|---|
| 1,660,051 | Sargent | Feb. 21, 1928 |
| 1,863,693 | Mingori | June 21, 1932 |
| 1,915,029 | Naylor | June 20, 1933 |
| 2,832,395 | Fisher | Apr. 29, 1958 |
| 2,838,089 | Weisner | June 10, 1958 |
| 2,946,116 | Norris et al. | July 26, 1960 |
| 3,073,372 | Lang | Jan. 15, 1963 |

FOREIGN PATENTS

| | | |
|---|---|---|
| 1,128,591 | France | Aug. 27, 1956 |